US007246090B1

(12) United States Patent
Thomas

(10) Patent No.: US 7,246,090 B1
(45) Date of Patent: Jul. 17, 2007

(54) METHOD FOR DETECTING ABERRANT BEHAVIOR OF A FINANCIAL INSTRUMENT

(75) Inventor: Christopher K. Thomas, Port Hope (CA)

(73) Assignee: MeasuredMarkets Inc., Fort Hope, Ontario (CA)

(*) Notice: Subject to any disclaimer, the term of this patent is extended or adjusted under 35 U.S.C. 154(b) by 708 days.

(21) Appl. No.: 09/695,059

(22) Filed: Oct. 25, 2000

Related U.S. Application Data

(60) Provisional application No. 60/161,083, filed on Oct. 25, 1999.

(51) Int. Cl.
G06Q 40/00 (2006.01)

(52) U.S. Cl. .................................. 705/36 R; 705/35

(58) Field of Classification Search ............... 705/36
See application file for complete search history.

(56) References Cited

U.S. PATENT DOCUMENTS

| 5,101,353 | A | * | 3/1992 | Lupien et al. ................. 705/37 |
| 5,347,452 | A | * | 9/1994 | Bay, Jr. ........................ 705/37 |
| 6,012,042 | A | * | 1/2000 | Black et al. ............... 705/36 R |
| 6,098,051 | A | * | 8/2000 | Lupien et al. ............ 705/36 R |
| 6,405,204 | B1 | * | 6/2002 | Baker et al. .............. 705/36 R |
| 6,453,303 | B1 | * | 9/2002 | Li ............................. 705/36 R |
| 6,484,151 | B1 | * | 11/2002 | O'Shaughnessy ......... 705/36 R |
| 2002/0007331 | A1 | * | 1/2002 | Lo et al. ........................ 705/36 |
| 2002/0010618 | A1 | * | 1/2002 | Pellegrinelli et al. ......... 705/10 |

FOREIGN PATENT DOCUMENTS

EP    1122661 A1 *  8/2001

OTHER PUBLICATIONS

Stockgroup.com Launches New Investment Sites for Technical Investors, Stockscores.com Site Complements the Company's Suite of Online Investment Products, Apr. 20, 2000, CCN Disclosure, 2 pages.*
Scott, Jeffrey, Build a Powerful Portfolio, Computer Shopper, Feb. 1997, vol. 17, Issue 2, pp. 306-313.*
D' Amico, Marie, A Pice of the Pie in the Big Sky, Forbes, Apr. 11, 1994, ASAP Supplement, pp. 119-121.*
Keogh, Jim, Following the Stock Market Was Never Easier, Personal Computing, Nov. 1983, vol. 7, Issue 11, pp. 196-198.*

* cited by examiner

Primary Examiner—Jagdish Patel
Assistant Examiner—James M. Alpert

(57) ABSTRACT

A computer implemented method for identifying aberrant behavior of a financial instrument including: retrieving from a source of market data, closing price, volume and number of transactions conducted for the financial instrument in a selected trading session; recording in computer memory, the closing price, volume and number of transactions conducted for the financial instrument in the selected trading session; identifying a plurality of time periods of different sizes, each of said time periods terminating with the trading session of the financial instrument immediately preceding the selected trading session; obtaining and recording the average and standard deviation of the closing price, volume and number of transactions during each of the time periods; determining whether each of the closing price, volume and number of transactions differs from the average of the corresponding component during each of the time periods by a selected number of standard deviations and for each case in which such a difference is sufficiently large, recording an associated aberrant flag; counting the number of aberrant flags; and identifying and reporting behavior of the financial instrument as aberrant, or not aberrant, based on the total number of aberrant flags counted.

8 Claims, 5 Drawing Sheets

FIG. 3

| | | Last Trading Session | | | | | | | | K/2 | | | | |
|---|---|---|---|---|---|---|---|---|---|---|---|---|---|---|
| Symbol | Date 41 | Closing Price 42 | Volume 44 | Number of Transactions 46 | | | | | | | | | | |
| Inst 30 | 1/Oct/99 | 17 | 475,482 | 73 | | | | | | | | | | |

| Behavior Component | Time Period 40 | Average 48 | Standard Deviation 50 | Expected Variation 52 | Actual Variation 54 | Aberrant Flag 56 | Degree of Aberration 58 | Time Period Degree of Aberration 60 | Market Expected Variation 70 | Market Aberrant Flag 72 |
|---|---|---|---|---|---|---|---|---|---|---|
| Price | 5 days | 17.05 | 0.0548 | 0.0064 | -0.0029 | No | | 8.1920 | 0.0048 | No |
| Volume | 5 days | 47,070 | 21,408 | 0.9096 | 9.1016 | Yes | 8.1920 | | 2.3342 | Yes |
| Transactions | 5 days | 135.00 | 13.00 | 0.1926 | -0.4593 | Yes | -0.6519 | | 0.5334 | No |
| Price | 10 days | 17.02 | 0.0510 | 0.0060 | -0.0012 | No | | 5.5054 | 0.0056 | No |
| Volume | 10 days | 64,542 | 27,805 | 0.8616 | 6.3670 | Yes | 5.5054 | | 9.3243 | No |
| Transactions | 10 days | 131.00 | 11.20 | 0.1710 | -0.4427 | Yes | -0.6137 | | 1.2311 | No |
| Price | 15 days | 17.01 | 0.0645 | 0.0076 | -0.0008 | No | | 4.5203 | 0.0101 | No |
| Volume | 15 days | 73,792 | 34,065 | 0.9233 | 5.4435 | Yes | 4.5203 | | 8.1233 | No |
| Transactions | 15 days | 139.00 | 16.50 | 0.2374 | -0.4748 | Yes | -0.7122 | | 3.3441 | No |
| Price | 30 days | 17.04 | 0.0723 | 0.0085 | -0.0023 | No | | 4.6278 | 0.1231 | No |
| Volume | 30 days | 71,842 | 35,585 | 0.9906 | 5.6184 | Yes | 4.6278 | | 8.2134 | No |
| Transactions | 30 days | 142.00 | 25.50 | 0.3592 | -0.4859 | Yes | -0.8451 | | 0.1231 | Yes |
| Price | 60 days | 17.13 | 0.0010 | 0.0001 | -0.0078 | Yes | -0.0079 | 4.4035 | 0.0001 | Yes |
| Volume | 60 days | 73,046 | 40,676 | 1.1137 | 5.5094 | Yes | 4.3956 | | 8.1231 | No |
| Transactions | 60 days | 145.00 | 28.40 | 0.3917 | -0.4966 | Yes | -0.8883 | | 0.5452 | No |
| Price | 120 days | 17.60 | 0.6264 | 0.0712 | -0.0340 | No | | 1.7541 | 0.5623 | No |
| Volume | 120 days | 109,660 | 86,734 | 1.5819 | 3.3360 | Yes | 1.7541 | | 9.2342 | No |
| Transactions | 120 days | 175.00 | 79.70 | 0.9109 | -0.5829 | No | | | 0.9812 | No |
| Price | 1 year | 18.83 | 1.5358 | 0.1631 | -0.0974 | No | | 0.2281 | 0.2144 | No |
| Volume | 1 year | 140,535 | 151,443 | 2.1552 | 2.3834 | Yes | 0.2281 | | 9.1234 | No |
| Transactions | 1 year | 182.00 | 87.20 | 0.9582 | -0.5989 | No | | | 1.2134 | No |
| Price | 2 years | 18.95 | 2.1884 | 0.2310 | -0.1029 | No | | 0.0000 | 0.2342 | No |
| Volume | 2 years | 192,108 | 348,983 | 3.6332 | 1.4751 | No | | | 8.2134 | No |
| Transactions | 2 years | 215.00 | 130.00 | 1.2093 | -0.6605 | NO | | | 0.2344 | Yes |

Price Aberrant Flags 62: 1
Volume Aberrant Flags 63: 7
Number of Transactions Aberrant Flags 64: 5
Total Aberrant Flags 65: 13
Maximum Number of Flags 67: 24

Total Degree of Aberration 66: 15.8336

Market Price Aberrant Flags 74: 1
Market Volume Aberrant Flags 76: 1
Market Number of Transactions Aberrant Flags 78: 2
Total Market Aberrant Flags 80: 4

METHOD FOR DETECTING ABERRANT BEHAVIOR OF A FINANCIAL INSTRUMENT

This application claims priority from U.S. Provisional Application 60/161,083 filed Oct. 25, 1999, which is incorporated herein by this reference.

FIELD OF THE INVENTION

This invention relates to financial instruments. More particularly, the invention relates to a method for detecting changes in the attitude or perception of investors with respect to a financial instrument such as a stock, deduced from the trading activity.

BACKGROUND OF THE INVENTION

Financial instruments, such as stocks or bonds, are commonly traded on public and private markets or exchanges (referred to collectively herein as "markets"). A financial instrument may be said to have a "behavior" defined by various pieces of information relating to the trading of the instrument such as the price of the instrument, the volume or number of shares of the instrument traded in a trading session (i.e. the volume) and the number of individual transactions for the instrument during the trading session. In some cases, aberrant behavior may be related to the availability of new information relating to the business organization underlying the stock.

Investors have long sought methods of predicting or anticipating changes in the price of a financial instrument, such as a stock or bond, by attempting to detect changes and trends in the past behavior of the instrument. Many methods have been proposed for doing so.

Many of these methods rely on a statistical analysis of the instruments price over a selected prior period of time. Typically, such methods examine the average and standard deviation of the stock price. Methods which rely on price information only are unable to detect changes in the perception of an instrument which do not have substantial effect on its price. For example, if the volume of trading in a stock increases dramatically for a short period (i.e. a trading session or a part of a session), the price may not be substantially affected. However, investors may still wish to be alerted to the increase in volume, which may be related to an increase in demand or supply of the stock on the market and which may important for some investors in selecting their own transactions.

Similarly, methods which rely on a single selected time period may not be able to detect aberrant behavior which might have been identified if a different time period had been used. For example, some aberrations in a stock's price will seem large compared to the standard deviation of the stock's price over the last few days but may appear relatively small in comparison to the standard deviation of the stock's price over an extended period such as two years. Such an aberration will not be detected by a method which utilizes only data collected over a two year period. Other aberrations may be more easily detected when a shorter time period is used. For example, if a stock typically has a very steady price, but has recently experienced a volatile period, then the use of a short recent time period may not identify an aberrant change in the stock's behavior In many cases, an instrument is traded in more than one market. Methods which rely on information from only one market will fail to identify aberrant behavior which occurs on another market where that same instrument is traded. This may happen, for example, where a small group of investors, all of whom trade on one market learn some information relating to an instrument. These investors may enter into transactions which lead to aberrant behavior of the instrument. Such aberrant behavior will not be detected if information from that market is not considered by the method.

Variations in the behavior of an instrument may be related to overall changes in the market or exchange on which the instrument is traded. As a result, methods which consider only the behavior of the instrument and ignore the overall behavior of the underlying market may identify an instrument as having aberrant behavior when in fact the instrument's behavior was entirely in keeping with overall changes in the market.

Accordingly, there is a need for a method for detecting aberrant behavior of a financial instrument which takes into account multiple factors relating to the instrument over varied time periods. Where the instrument is traded on multiple markets, the method will preferably also take into account the behavior of the instrument on at least some, or more preferably, on all of those markets. The method will preferably also consider the behavior of the instrument in the context of the overall market or markets on which the instrument is traded.

SUMMARY OF THE INVENTION

The present invention provides a method for identifying aberrant behavior in the trading of a financial instrument. The method examines three components of the instruments behavior: the closing price, the volume of transactions and the number of individual transactions. The closing price and volume of transactions in a financial instrument are commonly available pieces of information for publicly traded instruments. However, the total number of transactions in an instrument during a trade session is not generally reported by stock exchanges, etc. Accordingly, this information must be calculated by monitoring data feeds from relevant markets.

The method of the present invention compares the value of the three components of behavior of the instruments with the average of those components during a series of time periods. The lengths of the time period may range from relatively short (five days) to relatively long (several years or longer). Each time period ends with the trading session immediately preceding the most recent trading session. When a component of the behavior of the instrument in its most recent trading session differs from the average for that component in a particular time period by more than a selected amount (which is in turn determined by multiplying the standard deviation of the component over the time period by a selected constant), then an "aberration flag" is raised and a degree of aberration is calculated. The degree of aberration indicates the magnitude (in percentage) of the difference between the actual behavior of the component and its expected behavior based on the average over the particular time period. The degrees of aberration for all components based on a single time period are combined by summing the absolute value of the degree of aberration for the price component with a positive degree of aberration for the volume and number of transaction components. The time period degrees of aberration are summed and scaled by the ratio of the number of aberrant flags to the maximum possible number of aberrant flags to provide a total degree of aberration for the instrument on it most recent trading day.

In a similar manner, the behavior of the instrument is also compared to the expected behavior of the market, and sufficiently large differences between the two are identified as market aberrations. Generally, the market will exhibit a higher standard deviation for each component of its behavior than a typical instrument and therefore, few if any market aberration flags will be raised for a particular instrument after a typical trading session.

The results of the method are provided in a report, which can be used in a number of ways to identify whether the financial instrument or its associated business organization warrants further investigation to determine the cause of the aberration.

First, any aberrant flags may be used to indicate that the instrument warrants further investigation.

Second, a number of aberrant flags raised for the instrument may be compared to the maximum number of flags, and the instrument may be deemed to require further investigation only if a certain percentage (i.e. 25%) of the maximum number of flags is in fact raised.

Third, the number of market aberrations for an instrument may be reviewed. If any market aberration is identified, the instrument may be considered to warrant investigation.

Fourth, the number of aberrant flags (compared to the history of the instrument itself) may be plotted for consecutive trading sessions, and substantial changes in the number of flags raised may be relied on to indicate that a change in the public perception of the instrument has occurred, warranting further investigation.

Fifth, the total degree of aberration for a series of trading sessions may be plotted and substantial changes in this index may be relied on as an indicator that the instrument warrants further investigation.

BRIEF DESCRIPTION OF THE DRAWINGS

A preferred embodiment of the present invention will now be described in detail with reference to the drawings, in which:

FIG. 3 is a table illustrating the operation of the method of FIG. 2;

DETAILED DESCRIPTION OF THE PREFERRED EMBODIMENT

Figure 1:
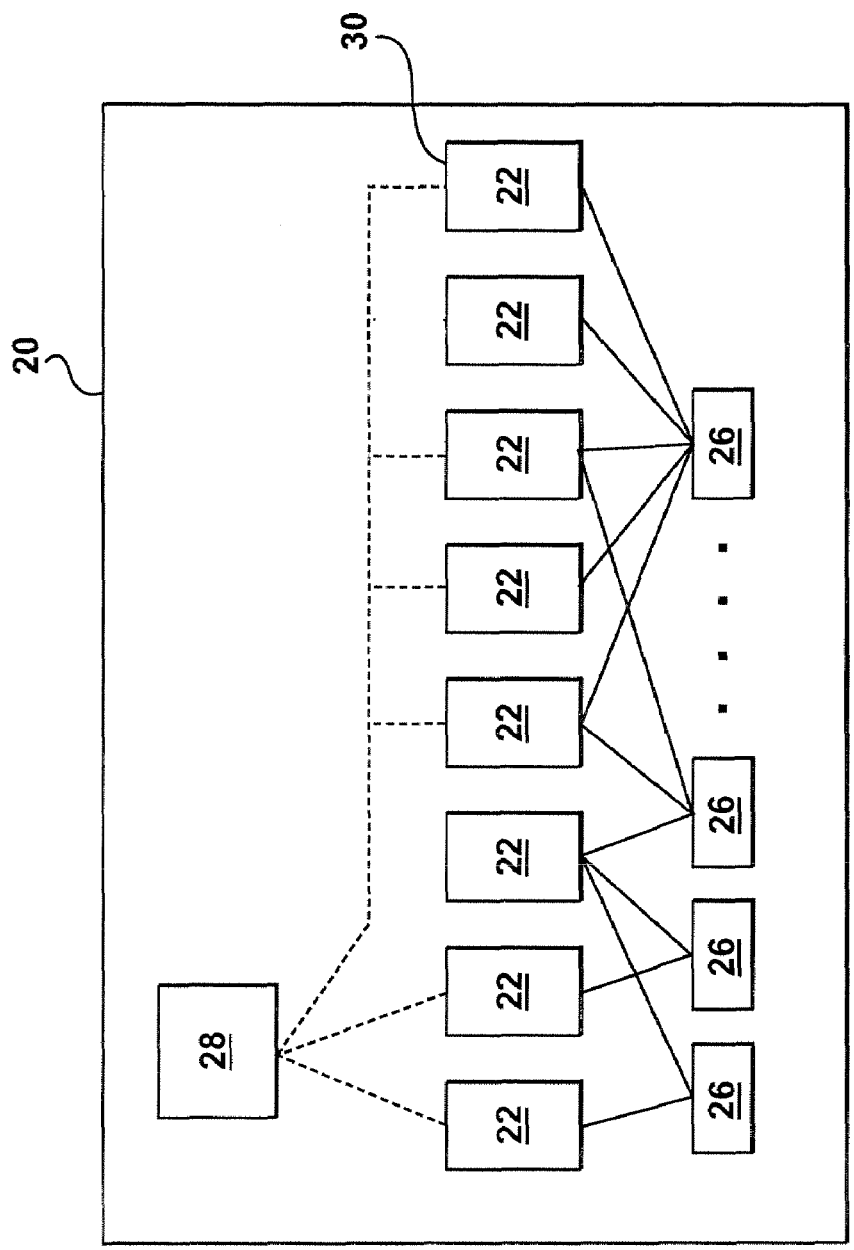
FIG. 1 is a block diagram illustrating a typical market on which financial instruments are traded.

Reference is first made to FIG. 1, which illustrates a typical financial instrument market 20 in a simplified form. Market 20 may be a public or private market or exchange, such as a stock market. Market 20 comprises a plurality of instruments 22, which may be stocks. Instruments 22 are traded by investors 26. Depending on the structure of market 20, this trading may be accomplished through agents (not shown). An index 28 is calculated to give a represent value of the stocks in market 20. Index 28 may be calculated based on all of the instruments 22 or may be calculated based on only a subset of the instruments 22. Index 28 may be one of a number of types of well known indexes for financial instruments. Index 28 may be designed to indicate the total value of the instruments 22 used to calculate it, or may be designed to indicate an average value change in the instruments 22 used to calculate it, or it may have another design. A person skilled in the art will be capable of selecting a method of calculating index 28 to reflect one or more aspects of the market 20.

Figure 2:
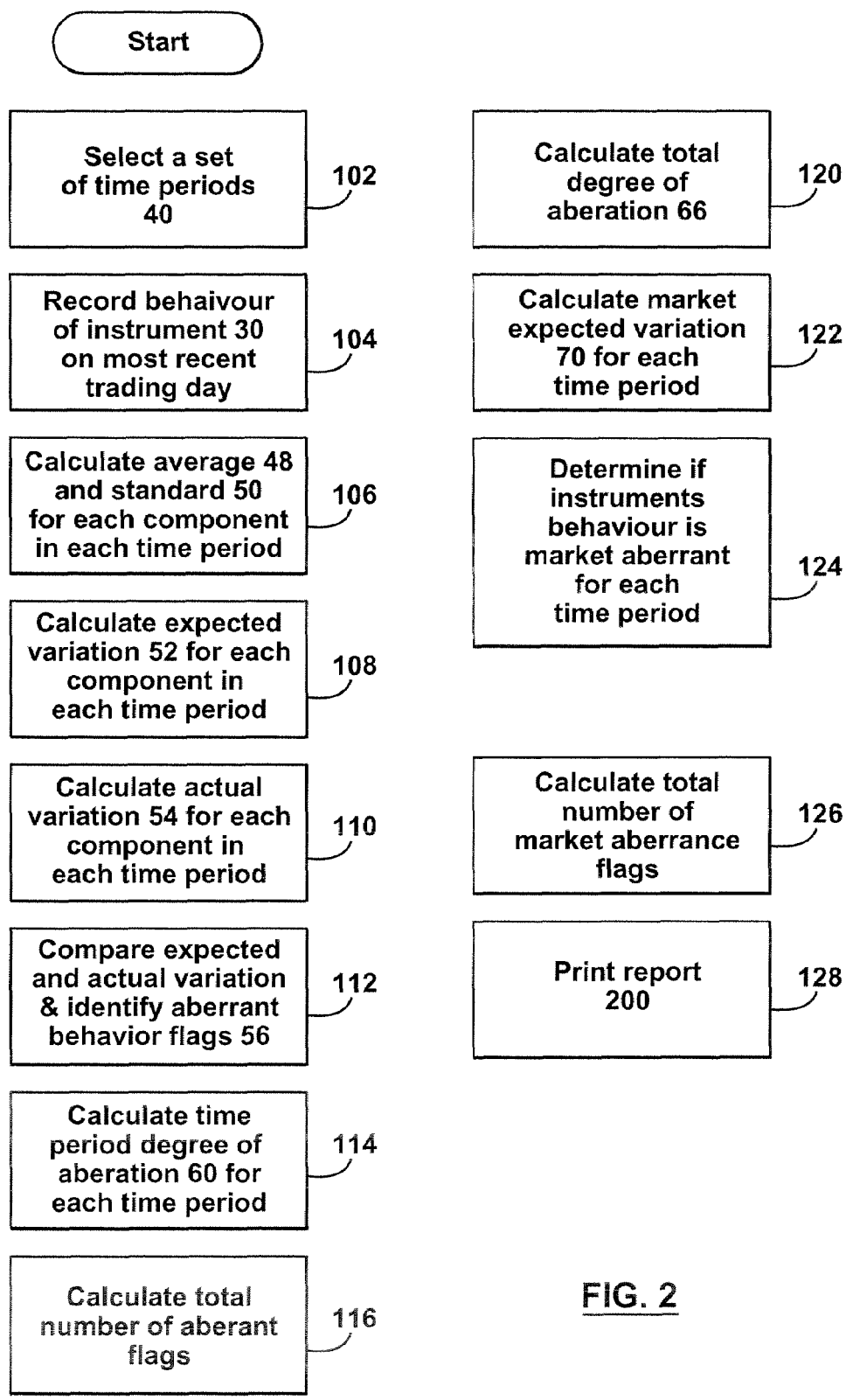
FIG. 2 is a flowchart illustrating a method for identifying aberrant behavior of a financial instrument.

FIG. 2 is a flowchart illustrating a method 100 according to the present invention. Method 100 allows a particular financial instrument 22 (FIG. 1) to be evaluated to determine if it is exhibiting an aberrant market behavior. Method 100 relies on three components of the behavior of an instrument 22: the instrument's price during a set of trading sessions, it's volume (i.e the number of shares of the instrument traded) during each of the trading sessions; and the actual numbers of transactions for the instrument during each of the trading sessions. Instruments 22 include a particular instrument 30. Method 100 will be described using instrument 30 as an example. Method 100 will also be explained with reference to FIG. 3, which is a table showing the results of the steps of method 100.

Method 100 commences in step 102, in which a plurality of time periods 40 are selected. The behavior of instrument 30 during each of these time periods 40, immediately prior to the current day, is used in method 100. These time periods will preferably include some relatively short time periods (i.e. 2-10 days) and some relatively long periods (i.e. longer than 1 year1). Each time period 40 includes a series of consecutive trading sessions, and each time period 40 ends with the trading session preceding the most recent trading session of instrument 30. For example, if a particular period is 1 year and the most recent trading session of instrument 30 took place on Sep. 9, 2000, then the 1 year time period would run from Sep. 9, 1999 to Sep. 8, 2000 and will include all trading sessions on and between those dates.

As an example, eight time periods 40 may be used to assess instrument 30; five days, ten days, fifteen days, thirty days, sixty days, one hundred and twenty days, one year and two years. This set of time periods 50 is weighted somewhat towards the shorter periods (i.e. 4 of the 8 time periods are thirty days or less). This will produce an analysis that is correspondingly weighted towards the shorter time periods. A different selection of time periods may have a more balanced weighting of time periods or may be weighted in a different way. Any number of time periods may be used with the present invention and time periods may be chosen in any way.

Method 100 next proceeds to step 104. In this step, the date 41 of the most recent trading session of instrument 30 is recorded along with the following three components of the behavior of instrument 30 on that date: (i) the instrument's closing price 42 on date 41; (ii) the volume 44 of trading in instrument 30 on date 41; and (iii) the number of transactions 46 for instrument 30 on date 41.

Referring to FIG. 3, the date 41 is recorded as 1 Oct. 1999. The closing price 42 of instrument 30 on that day was 17, the volume 44 was 475,482 and the number of transactions 46 was 73.

Referring again to FIG. 2. Method 100 next proceeds to step 106, in which the average 48 and standard deviation 50 of each component (i.e. (i) closing price; (ii) volume and (iii) number of transactions) of the behavior of instrument 30 for each trading session during each time period 40 selected in step 102 is calculated.

Referring to FIG. 3, the average closing price for instrument 30 on the five days preceding 1 Oct. 1999 was 17.05 and the standard deviation of the price was 0.0548. The average volume for instrument 30 during the two years preceding 1 Oct. 1999 was 192,108 and the standard deviation of the volume during this period was 348,983.

Reference is again made to FIG. 2. Method 100 next proceeds to step 108, in which an expected variation 52 for each component of the behavior of instrument 30 is calculated, based on each time period 40. The value of expected variation 52 for a particular component calculated based on a particular time period 40 (i.e. the expected variation 52 of the closing price of instrument 30, based on the closing prices over the previous five days) represents the expected maximum difference between the instruments most recent actual value for that component (i.e. the closing price on date 41) and the average for that component during the period in question, expressed as a percentage of the average. Expected variation 52 is calculated as follows:

$$\text{Expected Variation } 52 = \frac{K \times \text{Standard Deviation } 50}{\text{Average } 48}$$

K is a constant selected for market 20 based on one of the following criteria:
  i. K may be selected to represent the volatility of the market 20 on which instrument 30 is traded. For example, a selected market may be assigned a K=1 and all other markets may be compared to it. If we assume that the volatility of a market may be approximated by calculating the standard deviation of an index related to the market, then the volatility of two market may be compared by comparing the standard deviation of their indexes. First, the standard deviation of the net change in a selected set of trading sessions (i.e. all trading sessions in the previous year) in an index related to the selected market or exchange may be calculated. The standard deviation of the net change in index 28 (FIG. 1) during the same set of trading session may then be calculated. The value of K for market 20 may then be calculated by dividing the standard deviation in index 28 by the standard deviation of the net change in the selected market. This will effectively "normalize" the volatility for market 20 to the volatility of the selected market.
1. K may be selected by trial and error so that method 100 identifies a pre-selected number of financial instruments 22 traded on market 20 as exhibiting aberrant behavior. For example, method 100 may be repeated iteratively until a K value is found which identifies 20-25% of the instruments 22 after a majority of trading sessions.

Where instrument 20 is traded on multiple markets, K may be calculated based on the volatility of all such markets (for method (i) above) or based on the total number of stocks on all such markets (for method (ii) above).

In the present exemplary embodiment of method 100, K=2. This value was selected by trial and error in accordance with method (ii) above.

Referring to FIG. 3, the expected variation 52 for the closing price of instrument 30 based on the five day time period 40 is calculated as:

$$\text{Expected Variation (Five days/Price)} = \frac{2 \times 0.0548}{17.05} = 0.0064$$

This means that the closing price 42 of instrument 30 in its most recent trading session (1 Oct. 1999) is expected to vary by up to 0.642% from the average closing price during the five day time period.

Similarly, the expected variation 52 for the volume of instrument 30 based on the two year period is:

$$\text{Expected Variation (Two Years/Volume)} = \frac{2 \times 348,983}{192,108} = 3.6332$$

This means that the volume 44 of instrument 30 in its most recent trading session (1 Oct. 1999) is expected to vary by up to 363.32% from the average volume during the two year period.

Reference is again made to FIG. 2. Method 100 next proceeds to step 110, in which the actual percentage variation 54 between the most recent value of each component of the behavior of instrument 30 and the average price during each of the time periods 40 is calculated. In the case of the price component of the behavior of instrument 30, actual variation 54 for each time period 40 is calculated as follows:

$$\text{Actual Variation } 54 = \frac{\text{Price } 42 \text{ (on date } 41) - \text{Average } 48}{\text{Average } 48}$$

where the average 48 is the average value of the closing price in each respective time period 40. The actual variation 54 for the volume and number of transactions components of the behavior of instrument 30 are calculated in a similar fashion.

Referring to FIG. 3, the actual percentage variation 54 between the current price 42 and the average price over the preceding five day is calculated as follows:

$$\text{Actual Variation (Five days/Price)} = \frac{17 - 17.05}{17.05} = -0.0029$$

The actual percentage variation 54 between the current volume 44 and the average volume over the preceding 2 years is calculated as follows:

$$\text{Actual Variation (Two Years/Volume)} = \frac{475,482 - 192,108}{192,108} = 1.4751$$

Reference is again made to FIG. 2. Method 100 next proceeds to step 112, in which the actual variation 54 for each component of the behavior of instrument 30 in each time period 40 is compared to the expected variation 52 for that component and time period 40. For each component and time period 40, if the actual variation 54 exceeds the expected variation 52, then that component and time period is marked as having an aberrant flag 56 and a degree of aberration 58 is calculated as follows:

Degree of Aberration 58=|Actual Variation 54|−Expected Variation 52

The usage of the aberrant flags 56 and degree of aberration is explained further below.

Referring to FIG. 3, the price component of the behavior of instrument 30 is not considered aberrant (i.e. it does not have an aberrant flag 54) compared to the previous five day period, since the absolute value of the actual percentage variation 54 of the closing price 42 compared to the average price during the five day period (0.0029) is less than expected variation 52 (0.0064) based on that period. However, the volume 44 of instrument 30 (on 1 Oct. 1999) is considered aberrant (i.e. it does have an aberrant flag 56) since the absolute value of actual percentage variation 54 of the current volume 44 compared to the average volume during the five day period (9.1016) is greater than the expected variation 52 (0.9096). The degree of aberration 58 for volume 44 compared to the average volume during the five day period is calculated as:

$$\text{Degree of Aberration } 58 = |9.1016| - 0.9096 = 8.1920$$

Reference is again made to FIG. 2. Method 100 next proceeds to step 114, in which a time period degree of aberration 60 is calculated for each time period 40. Time period degree of aberration 60 for any particular time period N is calculated as follows:

Time Period Degree of Aberration(Time Period N)

=|Degree of Aberration for Price in Time Period N|

+(Degree of Aberration for Volume in Time Period N, if it is positive)

+(Degree of Aberration for Number of Transactions in Time Period N, if it is positive)

Time period degree of aberration 60 is intended to provide an overall indication of the extent to which the instruments behavior deviates from the behavior expected based on the time period under consideration. In general, investors are most concerned with the price component of the behavior of a financial instrument, such as instrument 30. The absolute value of the degree of aberration 58 for the price component of the instrument's behavior is always included in the time period degree of aberration 60. However, aberrations in the volume and number of transactions components will generally only be of interest when the aberration results from volume and/or transaction levels that are higher than expected. One reason for this is that an imbalance in the information available to investors is more likely to increase the amount of activity around a financial instrument 20, rather than to decrease it Accordingly, the degree of aberration 58 for these components is only included in the time period degree of aberration 60 if it is positive.

Referring to FIG. 3, the time period degree of aberration 60 for the sixty days time period 40 is calculated as follows:

$$\text{Time Period Degree of Aberration (Sixty Days)} = |-0.0079| + 4.3956 + 0 = 4.4035$$

Reference is again made to FIG. 2. Method 100 next proceeds to step 116, in which the total number of aberrant flags for each component of the behavior of instrument 30 is calculated. In addition, a total number of aberrant flags 65 and the maximum number of aberrant flags 67 for all components and all time periods 40 is calculated. Referring to FIG. 3, the total number of price aberrant flags 62, volume aberrant flags 63 and number of transactions aberrant flags 64 are 1, 7 and 5, respectively. The total number of aberrant flags 65 is 13 and the maximum number of aberrant flags 67 is 24.

Reference is again made to FIG. 2. Method 100 next proceeds to step 120, in which a total degree of aberration 66 for the behavior of instrument 30 is calculated as follows:

Total Degree of Aberration 66 =

Sum of All Time Period Degrees of Aberration 60 ×

$$\frac{\text{Total Aberrant Flags 65}}{\text{Maximum Aberrant Flags 67}}$$

Referring briefly to FIG. 3, the total degree of aberration 66 for instrument 30 on 1 Oct. 1999 is calculated as follows:

Total Degree of Aberration 66 =

$$(8.1920 + 5.5054 + 4.5203 + 4.6278 + 4.4035 +$$
$$1.7541 + 0.2281 + 0.000) \times \frac{13}{24} = 15.8336$$

Method 100 next proceeds to step 122. In this step, a market expected variation 70 is calculated for market 20 for the same three components (price, volume and number of transactions) and for the same time periods 40 selected in step 102. Since market 20 as a whole does not have a price per se, the calculations for this component are done using the closing value of index 28 in each trading session. The volume and number of transactions components will be based on the total volume and number of transactions for financial instruments 22 which are used to calculate index 28. The steps in the calculation of the expected market variation 70 are not shown in detail, since they are similar to steps 106-108. The value of K previously selected (as described in step 108) is used for the calculation of the market expected variation values 70. FIG. 3 illustrates an exemplary market expected variation 70 for each component and time period 40.

Method 100 next proceeds to step 124, in which the actual variation 54 for each component and time period 40 is compared with the corresponding market expected variation 70 to determine if that component of the behavior of instrument 30 is aberrant when compared to the market as a whole. If the actual variation 54 for a component in a time period 40 exceeds the expected market variation 70, then a market aberration flag 72 is set for that component.

Method 100 next proceeds to step 126, in which the number of market aberrant flags (i.e. market price aberrant flags 74, market volume aberrant flags 76 and market number of transactions aberrant flags 78) for each component of the behavior of instrument 30 and the total number of market aberrant flags 80 are calculated.

Referring to FIG. 3, the number of market price aberrant flags 74 is shown as 1, the number of market volume aberrant flags 76 is shown as 1 and the number of market number of transactions aberrant flags 78 is shown as 2. The total number of market aberrant flags 80 is shown as 4.

Reference is again made to FIG. 2. Method 100 next proceeds to step 128, in which a report 200 (not shown) is produced to indicate the results of method 100. Report 200 includes the following information:

total number of price flags 62 total number of volume flags 63 total number of volume/transaction flags 64 total number of total flags 65 total maximum possible number of flags
total degree of aberration 66
total market price flags 74
total market volume flags 76
total market volume/transaction flags 78
total market flags 80
if the number of total flags 65 is greater than 0, an indication that the behavior of instrument 30 on the most recent trading is identified as aberrant
if the number of total market flags is greater than 0, an indication that the behavior of instrument 30 on the most recent trading day is identified as market aberrant.
Method 100 then ends.

Report 200 may be used by an investor 26 in several ways.

First, if any aberrant flag 65 is indicated in report 200, this may indicate that the perception of investors towards instrument 30 has changed. As a result, the business organization associated with instrument 30 may warrant investigation to determine if any basis for a potential change in the perception of investors exists. Such a basis may include a press release by the business organization relating to its financial performance, a change in investor confidence in the economic sector to which the business organization belongs, etc.

Second, the number of aberrant flags 65 may be compared to the possible maximum number of flags. The inventor has found that some financial instruments which do not actually warrant investigation will often have one or more aberrant flags 65. Accordingly, the inventor has determined that a financial instrument 20 and the business organization associated with it is more likely to warrant investigation if the total number aberrant flags 65 is more than 25% of the maximum possible number of flags is actually.

A third way of using report 200 involves the total number of market aberrant flags 80. Typically, the components of the behavior of a market as a whole will have a much larger standard deviation than those of a particular financial instrument traded on the market. As a result, the market expected variation 70 (FIG. 3) for most components of market behavior will be larger than the corresponding expected variation 52 for an individual instrument 20. The inventor has found that while many instruments 20 will have a small number of aberrant flags 65 (i.e. one or two flags) for many trading sessions, most of these instruments 20 will have no total market aberrant flags 80 for the same trading sessions. An instrument which has a market aberrant flag may therefore be considered to be highly aberrant. This data may be used to reinforce the conclusion that an instrument is behaving highly aberrantly based on the number of total aberrant flags 65 for that instrument 20.

Typically, method 100 will be carried out for a number of instruments 20 which are of interest to a particular investor or group of investor. The reports 200 prepared for each such instrument 20 may be combined into a single report which lists any instrument which is newly identified as having aberrant under the criteria discussed in the first three methods of using report 200 above. Such a report will allow an investor to quickly determine which instruments 20 warrant greater concern due to their behavior in a particular trading session.

Figure 4:
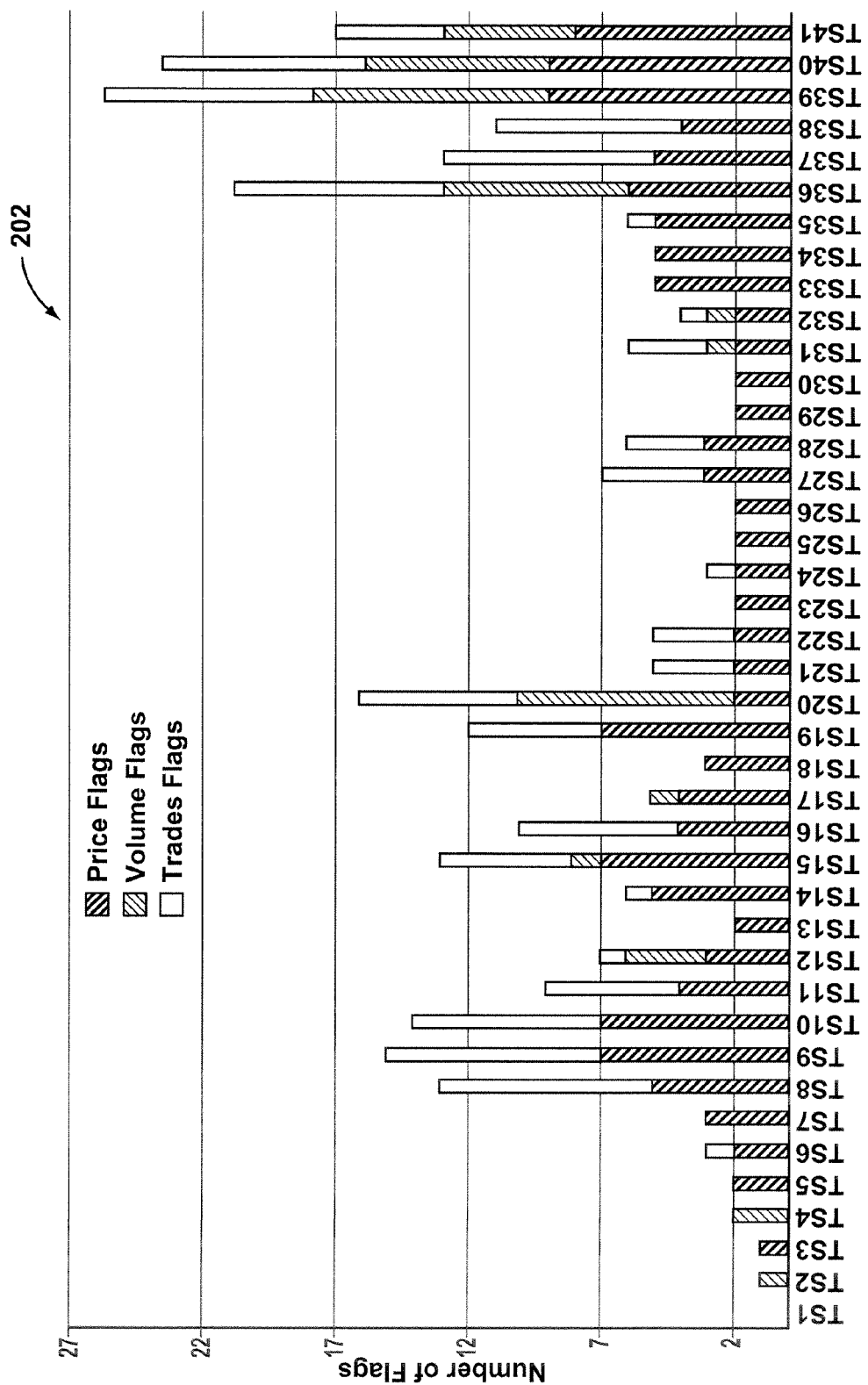
FIG. 4 is a report which may be used to analyze the results of the method of FIG. 2.

Reference is next made to FIG. 4, which is a graphical report 202 which illustrates a fourth way of using report 200. In report 202, the total number of aberrant flags 65 indicated for instrument 30 for a series of trading sessions TS1-TS41 is shown, This information will be available from the report 200 produced for the instrument 30 after each of the trading sessions. An investor may use report 202 to identify a period of aberrant behavior by instrument 30 over a series of trading sessions. One way of doing so is to calculate the average and standard deviation of the number of total aberrant flags 85 identified for the instrument over a selected number of prior trading sessions. If the number of flags for the current session exceeds the average by a selected number of standard deviations, then the instrument 30 and the associated business organization may warrant investigation. For example, if the selected number of sessions is 5 and the selected number of standard deviations is 1, an investor may carry out the following analysis after TS8:

Flags in five most recent trading sessions (TS3-TS7): 1, 2, 2, 3, 3.
Average number of flags in five most recent trading sessions: 2.2
Standard Deviation of number of flags in five most recent trading session: 0.84
Threshold for identifying whether an investigation is warranted: 2.2+1×0.84=3.04
Number of flags on TS8: 13
Result: Investigation is warranted.

Figure 5:
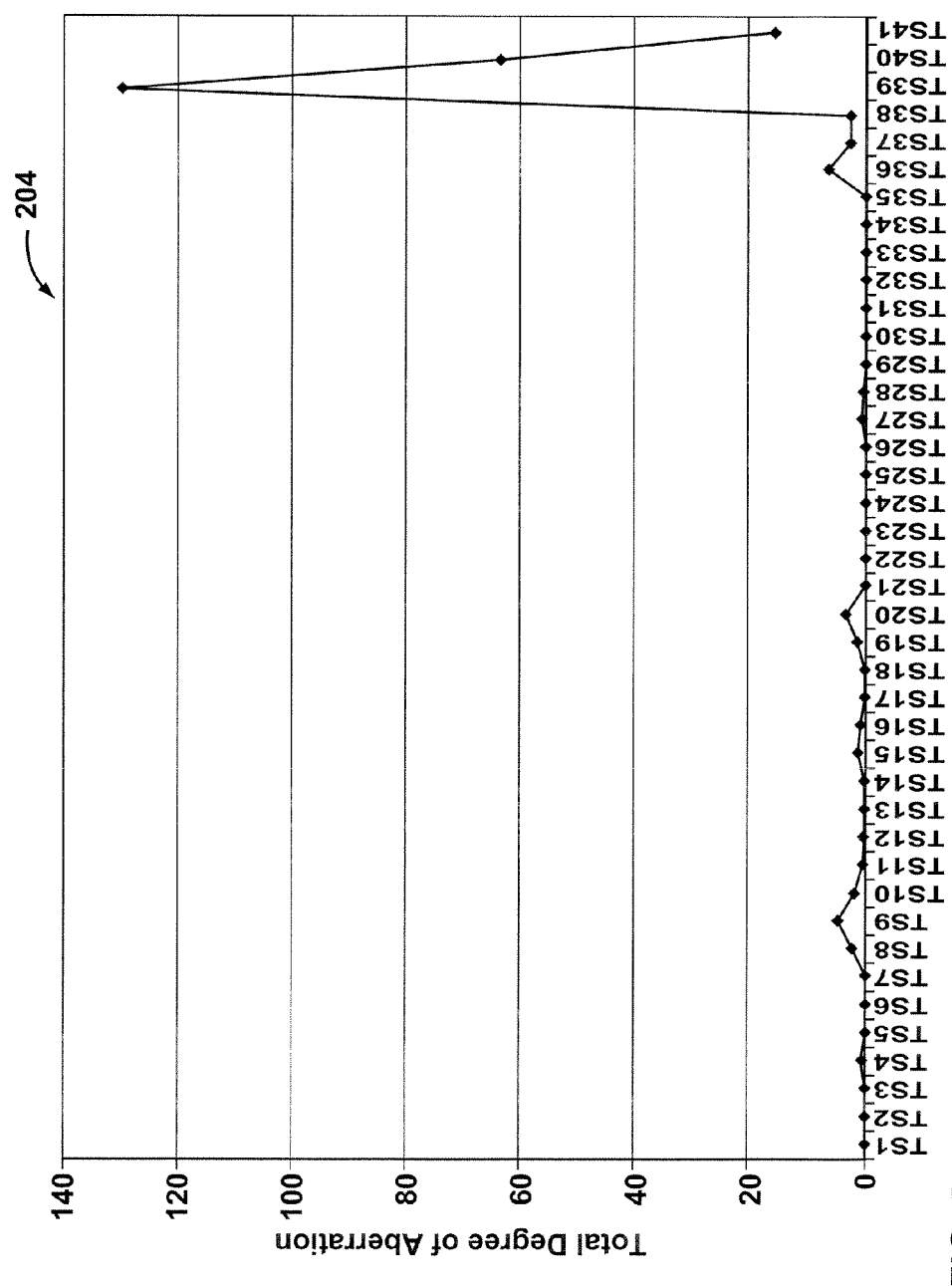
FIG. 5 is a second report which may be used to analyze the results of the method of FIG. 2.

If the threshold is exceeded for several trading sessions (i.e. TS8, TS9, TS10), the need for an investigation is more clearly warranted Reference is next made to FIG. 5, which is a graphical report 204 that illustrates a fifth way of using the information provided in report 200. Report 204 is a graph of the total degree of aberration 66 for instrument 30 on trading session TS1-TS 41. This report may be used in a manner similar to that described above for report 202. By comparing the total degree of aberration 66 for a particular trading session with the total degree of aberration with a series of previous trading sessions, the need to investigate instrument 30 and its related business organization may be identified. For example, the increase in the total degree of aberration shown TS8, TS9, TS20 and TS36 each exceed the sum of the average and one standard deviation of the total degree of aberration 66 over the previous five days. The investors has found an extremely large change in the total degree of aberration, such as the change shown on TS39, will typically occur when new information which causes a major change in the perception of a financial instrument becomes widely available to investors.

Like the first three ways of using report 200, the fourth and fifth ways of using report 200 may also be used to provide a daily report indicating instruments 20 which are newly identified as warranting investigation.

The inventor has implemented method 100 as a computer program. This computer program is also capable of automatically producing reports 202, 204 and 206, and implementing the five ways of using report 200 to provide automated lists of instruments warranting investigation.

A preferred embodiment of the present invention has been described. Furthermore, a number of ways of using the report 200 produced by using method 100 have been described. Each of these ways of using report 200 is also part of the present invention. Other variations of the present invention will be apparent to a person skilled in the art. All such variations fall within the scope of the present invention, which is limited only by the following claims.

The invention claimed is:

1. A computer implemented method for identifying aberrant behavior of a financial instrument comprising:
    (a) providing a computer;
    (b) retrieving from a source of market data, closing price, volume and number of transactions conducted for the financial instrument in a selected trading session;

(c) recording in memory accessible by the computer, the closing price, volume and number of transactions conducted for the financial instrument in the selected trading session;

(d) identifying a plurality of time periods of different sizes, each of said time periods terminating with the trading session of the financial instrument immediately preceding the selected trading session;

(e) obtaining and providing in memory accessible by the computer, the average and standard deviation of the closing price, volume and number of transactions during each of the time periods;

(f) determining whether the closing price, differs from the average of the corresponding component during each of the time periods by a selected number of standard deviations and for each case in which such a difference is sufficiently large, recording an associated aberrant flag;

(g) determining whether the volume and number of transactions are each greater than the average of the corresponding component during each of the time periods by a selected number of standard deviations and for each case in which such a difference is sufficiently large, recording an associated aberrant flag;

(h) counting the number of aberrant flags;

(i) identifying behavior of the financial instrument as aberrant, or not aberrant, based on the total number of aberrant flags counted; and (j) creating a report indicating the aberrancy, or lack thereof, of the financial instrument.

2. A method as claimed in claim 1, wherein prior to step (j), the step of identifying behavior of the financial instrument as aberrant, or not aberrant, comprises:

(1) selecting a threshold value corresponding to an expected total number of aberrant flags;

(2) calculating the difference between the total number of aberrant flags and the threshold value; and (3) identifying the financial instrument as overall aberrant if the magnitude of the difference in step 2 is sufficiently large.

3. A method as claimed in claim 2, wherein the threshold value corresponds at least in part to the total number of possible aberrant flags that could be recorded in steps (f) and (g).

4. A method as claimed in claim 1, wherein the financial instrument is sold on at least one market, the at least one market has market indexes that are analogous to the closing price, the volume and the number of transactions, and wherein the selected number of standard deviations depends at least in part on standard deviations of the market indexes for the time periods.

5. A method as claimed in claim 1, wherein in step (g), for each time period, an aberrant flag is recorded if both the difference between the number of transactions for the selected trading session and the average number of transactions is sufficiently large and the number of transactions for the selected trading session is greater than the average numbers of transactions.

6. A method as claimed in claim 1, wherein one of the parameters is the volume, and wherein in step (g), for each time period, an aberrant flag is recorded if both the differences between the volume for the selected trading session and the average volume is sufficiently large, and the volume for the selected trading session is greater than the average volume.

7. A method as claimed in claim 1, wherein prior to step (j), the step of identifying behavior of the financial instrument as aberrant, or not aberrant, comprises:

(1) repeating steps (b) thru (h) over a selected number of trading sessions prior to the selected trading session, and calculating the average number of aberrant flags for the financial instrument over the selected number of sessions;

(2) comparing the number of aberrant flags counted in the selected trading session with the average number of aberrant flags calculated in step (1); and (3) identifying the behavior of a financial instrument as aberrant if the comparison in step (2) results in a difference above a threshold value.

8. A computer implemented method for identifying aberrant behavior of a financial instrument comprising:

(a) providing a computer;

(b) retrieving from a source of market data, the values of a plurality of parameters, the parameters including the number of transactions, the closing price and the volume, for the financial instrument in a selected trading session;

(c) recording in memory accessible by the computer, the values of the parameters;

(d) identifying a plurality of time periods of different sizes, each of said time periods terminating with the trading session of the financial instrument immediately preceding the selected trading session;

(e) obtaining and providing in memory accessible by the computer averages and standard deviations of the parameters for each time period;

(f) providing in memory accessible by the computer actual variations between the values of the parameters during the selected trading session and the average values of the parameters over each time period;

(g) selecting a set of expected variations for the values of the parameters over each time period, wherein the expected variations are selected depending on the averages and standard deviations of the parameters;

(h) identifying actual variations in the parameters that exceed the expected variations as aberrant;

(i) counting the total number of aberrants for the selected trading session;

(j) selecting a threshold value corresponding to an expected total number of aberrants for the selected trading session;

(k) providing in memory accessible by the computer the difference between the total number of aberrants for the selected trading session and the threshold value; and (l) creating a report indicating whether an overall financial instrument aberration exists, or does not exist, depending on the magnitude of the difference in step (k).

* * * * *